United States Patent [19]
Sasaki

[11] Patent Number: 5,488,556
[45] Date of Patent: Jan. 30, 1996

[54] APPARATUS AND METHOD FOR INDEPENDENTLY CONTROLLING DAMPING FORCE CHARACTERISTIC OF VEHICULAR SHOCK ABSORBER

[75] Inventor: Mitsuo Sasaki, Atsugi, Japan

[73] Assignee: Unisia Jecs Corporation, Kanagawa, Japan

[21] Appl. No.: 126,040

[22] Filed: Mar. 22, 1994

[30] Foreign Application Priority Data

Mar. 22, 1993 [JP] Japan .................................. 5-061942

[51] Int. Cl.$^6$ ................................................ B60G 17/00
[52] U.S. Cl. ...................................... 364/424.05; 280/707
[58] Field of Search ................................ 280/707, 772; 364/565, 424.05

[56] References Cited

U.S. PATENT DOCUMENTS

| | | | |
|---|---|---|---|
| 4,696,489 | 9/1987 | Fujishiro et al. | 280/707 |
| 5,096,219 | 3/1992 | Hanson et al. | 280/707 |
| 5,144,558 | 9/1992 | Fukushima et al. | 364/424.05 |
| 5,208,749 | 5/1993 | Adachi et al. | 364/424.05 |
| 5,301,130 | 4/1994 | Alcone et al. | 364/565 |

FOREIGN PATENT DOCUMENTS

| | | |
|---|---|---|
| 0217356 | 4/1987 | European Pat. Off. |
| 0266749 | 5/1988 | European Pat. Off. |
| 0426340A1 | 5/1991 | European Pat. Off. |
| 4113387A1 | 11/1991 | Germany. |
| 4119494A1 | 1/1992 | Germany. |
| 4137712A1 | 5/1992 | Germany. |

OTHER PUBLICATIONS

EPO Search Report; Patent Abstracts of Japan, vol. 16, No. 519, Oct. 26, 1992 Patent abstracts of Japan, vol. 17, No. 177; Patent Abstract of Japan, vol. 17, No. 186, Dec. 4, 1993; Patent Abstracts of Japan, vol. 16, No. 538, Sep. 11, 1992; Patent Abstracts of Japan, vol. 17, No. 304; Oct. 6. 1993.

Primary Examiner—Kevin J. Teska
Assistant Examiner—Dan Fiul
Attorney, Agent, or Firm—Ronald P. Kananen

[57] ABSTRACT

An apparatus and method for controlling damping force characteristics of shock absorbers independently of one another, the damping force coefficient for each shock absorber being controlled on the basis of so-called "sky hook" theory with respective sprung mass vertical velocities and relative velocities between the sprung mass and unsprung mass taken into consideration. The relative velocity detecting sensors are only installed on portions of the vehicle related to front left and right tire wheels. The road surface velocities on the front left and right tire wheels are calculated and the road surface velocities on the rear left and right tire wheels are calculated on the basis of the calculated front left and right wheel road surface velocities, a vehicular wheel base length, and a vehicle speed. Then, relative velocities between the sprung mass and unsprung mass related to the rear left and right tire wheels are calculated on the basis of the calculated rear left and right tire wheel road surface velocities and sprung mass vertical velocities related to the vicinities of the rear left and right tire wheels.

9 Claims, 12 Drawing Sheets

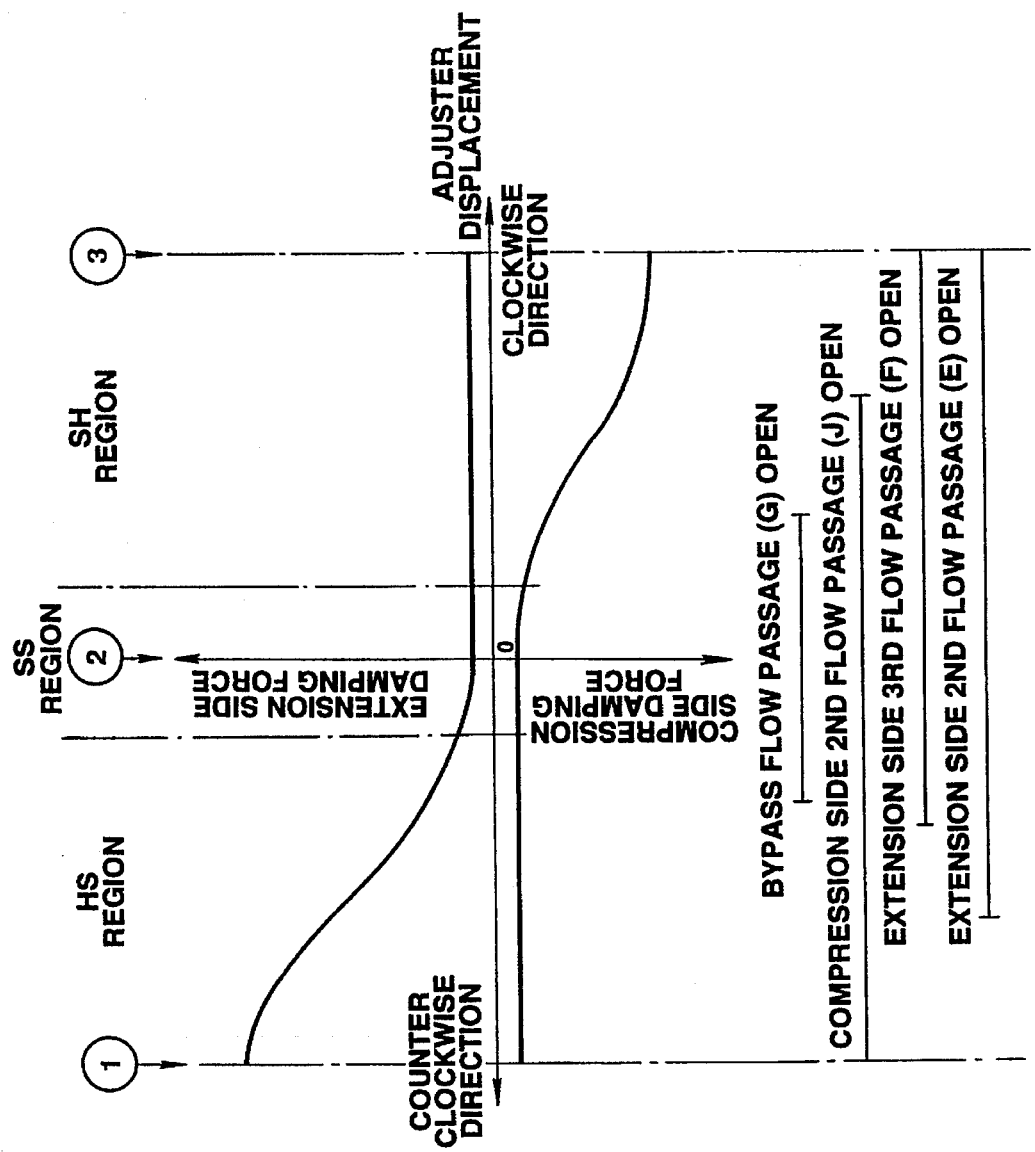

APPARATUS AND METHOD FOR INDEPENDENTLY CONTROLLING DAMPING FORCE CHARACTERISTIC OF VEHICULAR SHOCK ABSORBER

BACKGROUND OF THE INVENTION

1. Field of the Invention

The present invention relates to an apparatus and method for independently controlling damping force coefficients of four tire wheel suspension units (shock absorbers) of an automotive vehicle.

2. Description of Background Art

A Japanese Patent Application First Publication No. Showa 61-163011 exemplifies a vehicle suspension control apparatus.

A suspension control apparatus disclosed in the above-identified Japanese Patent Application Publication includes shock absorbers (also called dampers but herein after referred to as shock absorbers) generally located on respective four tire wheels.

In the above-identified Japanese Patent Application, sprung mass (namely, vehicle body) vertical velocities and relative velocities between the sprung mass and an unsprung mass (namely, each of tire wheels and associated tire wheel suspension members) are detected. If both signs (an upward direction is plus and a downward direction is minus) of the sprung mass vertical velocity and relative velocity are mutually the same, the related shock absorber is controlled to provide a hard characteristic for the shock absorber damping characteristic. On the other hand, if both signs described above are mutually different, the related shock absorber is controlled to provide a soft characteristic for the shock absorber damping characteristic.

Such a control method as described above is called suspension (shock absorber) control based on a "sky hook" theory and is carried out independently of the respective shock absorbers on the respective four tire wheels.

SUMMARY OF THE INVENTION

It is an object of the present invention to provide an apparatus and method for controlling damping forces of vehicular shock absorbers with less number of sensors to detect sprung mass vertical accelerations (velocities) and to detect relative velocities between the sprung mass and unsprung mass portions of the vehicle and which can carry out the damping force controls based on the sky hook theory with less cost of installing the sensors and with less trouble of wirings, particularly reducing the number of the sensors which detect the relative velocities between the sprung mass and unsprung mass portions related to the four tire wheels and having high mounting difficulties when they are actually mounted on portions of the vehicle.

The above-described object is derived from such industrial demands as described below.

That is to say, in the suspension control apparatus described in the above-identified Japanese Patent Application First Publication, there are two different types of sensors, one of which is installed for each tire wheel position to detect a sprung mass vertical velocity thereat and the other of which is also installed for each tire wheel to detect a relative velocity between the sprung mass and unsprung mass. Therefore, eight sensors, as a total, need to be installed in the vehicle. Consequently, to reduce the cost of mounting of sensors and to reduce their wiring troubles, the number of sensors have been demanded to be reduced. Furthermore, it is necessary for the other sensor which detects the relative velocity described above to be easy to receive a high frequency input from the unsprung mass and to have a high anti-vibration characteristic and it is necessary for the other sensor to attach a member to the unsprung mass side which would vibrate with high frequencies such as described above. In the latter case, it is necessary to have a high anti-vibration characteristic and it is necessary to wire the sensors and sensor signal receiving portion with a sufficient allowance for a relative displacement between the sprung mass and unsprung mass, i.e., such a wiring as not to disturb the relative displacement as described above. Consequently, the number of the other sensors have been demanded to be reduced.

Hence, the above-described object can be achieved by providing an apparatus for controlling damping force characteristics of vehicular shock absorbers (suspension units) independently of one another as defined in claim 1.

That is to say, the present invention provides an apparatus for controlling damping force characteristics of vehicular shock absorbers independently of one another, comprising: a) damping force characteristic changing means for changing damping force coefficients representing the respective damping force characteristics of the respective shock absorbers and variably selectable in the respective shock absorbers in response to control signals respectively input thereto; b) sprung mass vertical velocity determining means for determining vehicular behaviors related to the sprung mass vertical velocities in the vicinities to respective tire wheels of the vehicle; c) front tire wheel relative velocity determining means for determining the vehicular behaviors related to relative velocities between sprung mass portions and unsprung mass portions of the vehicle, said front tire wheel relative velocity determining means being disposed on vehicular portions placed in the vicinities to only front left and right tire wheels; d) vehicle speed detecting means for detecting a vehicle speed and outputting a vehicle speed indicative signal; e) wheel base length storing means for storing a wheel base length of the vehicle; f) front tire road surface velocity calculating means for calculating front tire wheel road surface velocities of the front left and right tire wheels on the basis of the relative velocities between the sprung mass portions and unsprung mass portions of the vehicle related to the front left and right tire wheels and determined by said relative velocity determining means and on the basis of the sprung mass vertical velocities determined by said sprung mass vertical velocity determining means related to the front left and right tire wheels; g) rear tire wheel road surface velocity calculating means for calculating rear left and right tire wheel road surface velocities from the front left and right tire wheel road surface velocities, the vehicle wheel base length, and the vehicle speed indicative signal; h) rear tire wheel relative velocity calculating means for calculating relative velocities between the sprung mass portions and unsprung mass portions of the vehicle related to rear left and right tire wheels on the basis of the rear left and right tire wheel road surface velocities calculated by said rear tire wheel road surface velocity calculating means and of the sprung mass vertical velocities determined by said sprung mass vertical velocity determining means related to the rear left and right tire wheels; and i) damping force characteristic controlling means for providing respective control signals for said damping force characteristic changing means in accordance with the determined and calculated respective relative velocities between the sprung mass portions and unsprung mass portions related to the respective tire wheels and with the determined respective sprung mass vertical velocities related to the respective tire wheels so that the respective shock absorbers provide optimum damping force characteristics.

The above-described object can also be achieved by providing a method for controlling damping force characteristics of vehicular suspension units independently of one another as defined in claim 6.

That is to say, the present invention also provides a method for controlling damping force characteristics for vehicular shock absorbers independently of one another, said shock absorbers having respective damping force characteristic changing means for changing the damping force coefficients representing the damping force characteristics and variably selectable in response to control signals respectively input thereto, comprising the steps of: a) determining vehicular behaviors related to the sprung mass vertical velocities in the vicinities to respective tire wheels of the vehicle; b) providing front tire wheel relative velocity determining means for the vehicular behaviors related to relative velocities between sprung mass portions and unsprung mass portions of the vehicle, said front tire wheel relative velocity determining means being disposed on vehicular portions placed in the vicinities to only front left and right tire wheels; c) detecting a vehicle speed and outputting a vehicle speed indicative signal; d) reading a wheel base length of the vehicle; e) calculating front tire wheel road surface velocities of the front left and right tire wheels on the basis of the relative velocities between the sprung mass portions and unsprung mass portions of the vehicle related to the front left and right tire wheels and determined by said relative velocity determining means and on the basis of the sprung mass vertical velocities determined by said sprung mass vertical velocity determining means related to the front left and right tire wheels; f) calculating rear left and right tire wheel road surface velocities from the front left and right tire wheel road surface velocities, the vehicle wheel base length, and the vehicle speed indicative signal; g) calculating relative velocities between the sprung mass portions and unsprung mass portions of the vehicle related to rear left and right tire wheels on the basis of the rear left and right road surface velocities calculated in the step f) and the sprung mass vertical velocities determined in the step a) and related to the rear left and right tire wheels; and h) providing the respective control signals for said damping force characteristic changing means in accordance with the determined and calculated respective relative velocities between the sprung mass portions and unsprung mass portions related to the respective tire wheels and with the determined and calculated respective sprung mass vertical velocities related to the respective tire wheels so that the respective shock absorbers provide optimum damping force characteristics.

The basic concept of the present invention will be described below:

When the vehicle runs on a road surface, the rear left and right tire wheels generally follow the same road surface on which the front left and right tire wheels have contacted. Thus, the front left and right tire wheel road surface velocities are calculated on the basis of the relative velocities between the sprung mass portions and unsprung mass portions of the vehicle at the front left and right tire wheels and of the sprung mass vertical velocities related to the vicinities to the front left and right tire wheels.

On the basis of the above premise that the rear tire wheels follow the same road surface on which the front tire wheels has passed, the same road surface velocities as those generated on the front tire wheels are generated on the rear tire wheels which pass thereafter on the same positions of the front tire wheels. Hence, the rear tire wheel road surface velocities are calculated by delaying the front left and right tire wheel road surface velocities on the basis of the wheel base length and the vehicle speed. Then, the rear tire wheel relative velocities between the sprung mass and unsprung mass portions related to the rear tire wheels are calculated on the basis of the rear tire wheel road surface velocities and the sprung mass vertical velocities related to the vicinities to the rear left and right tire wheels. The damping force coefficient controlling means provides the respective control signals for the respective damping force coefficient changing means on the basis of the calculated rear tire wheel relative velocities and determined front tire wheel relative velocities and on the basis of determined four tire wheel sprung mass vertical velocities. Such a control as described above is based on the sky hook theory.

BRIEF DESCRIPTION OF THE DRAWINGS

FIG. 6 is a damping coefficient characteristic graph corresponding to a stepped position of a representative pulse motor shown in FIG. 2.

BEST MODE CARRYING OUT THE INVENTION

Reference will hereinafter be made to the drawings in order to facilitate a better understanding of the present invention.

Figure 1:
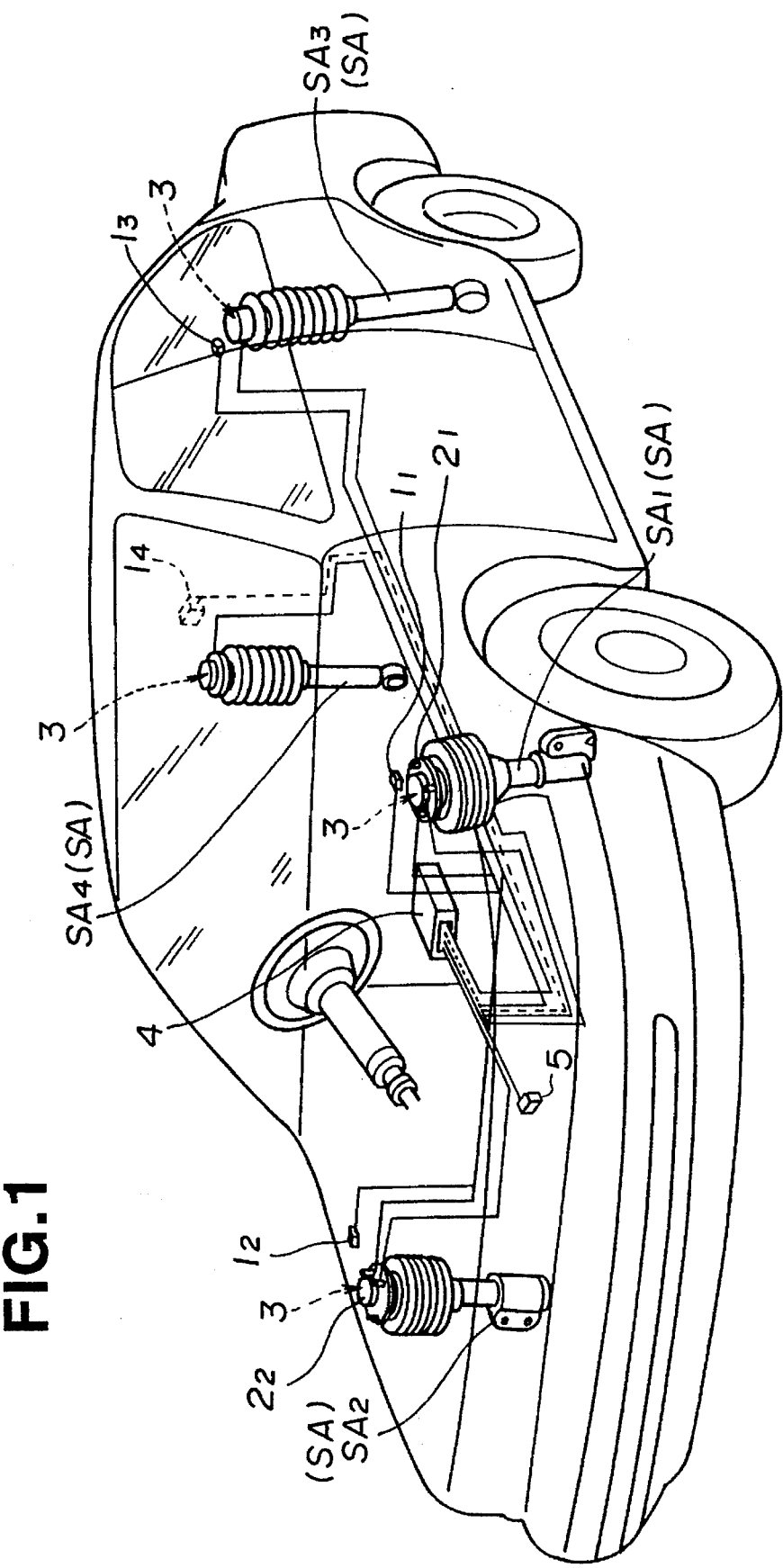
FIG. 1 is an explanatory perspective view of an automotive vehicle in which an apparatus for controlling damping forces of shock absorbers in a preferred embodiment is mounted.

FIG. 1 shows a whole system configuration of a vehicular shock absorber damping force controlling apparatus in preferred embodiment according to the present invention.

Four shock absorbers $SA_1$, $SA_2$, $SA_3$, and $SA_4$ (it is noted that a representative shock absorber is simply denoted by SA) are interposed between parts of a vehicle body (sprung mass) and respective tire wheels (unsprung mass). The tire wheels comprise front left tire wheel, front right tire wheel, rear left tire wheel, and rear right tire wheels of the vehicle.

At parts of the vehicle body, all shock absorbers $SA_1$ through $SA_4$ are mounted thereon and in the vicinities of the parts of the vehicle body, sprung mass (vehicle body) vertical acceleration sensors (also called sprung mass G sensors) $1_1$, $1_2$, $1_3$ and $1_4$ (hereinafter, one representative sprung mass vertical acceleration sensor is simply denoted by 1) are disposed so as to detect the sprung mass vertical (vehicular height direction) accelerations, i.e., vehicle behaviors related to the vertical velocities of the sprung mass.

In addition, in the vicinities of the parts of the vehicle body on which the respective shock absorbers $SA_1$ through $SA_4$ are mounted, stroke sensors $2_1$ and $2_2$ (hereinafter one representative stroke sensor is simply denoted by 2) are mounted thereon at the front left and front right tire wheels. The stroke sensors $2_1$ and $2_2$ serve to detect relative displacements between the sprung mass and unsprung mass (front left and front right tire wheels) on the front tire wheels. The stroke sensors 2 may alternatively be weight sensors.

Furthermore, a vehicle speed sensor 5 is disposed on an output axle of a power transmission to detect the vehicle speed. A control unit 4 is installed, in response to sensor signals from the respective sensors 1, 2, and 5, and functions to output a control signal to each pulse motor 3 associated with the representative shock absorber SA. A function of each one of the pulse (stepping) motors 3 will be described later.

Figure 2:
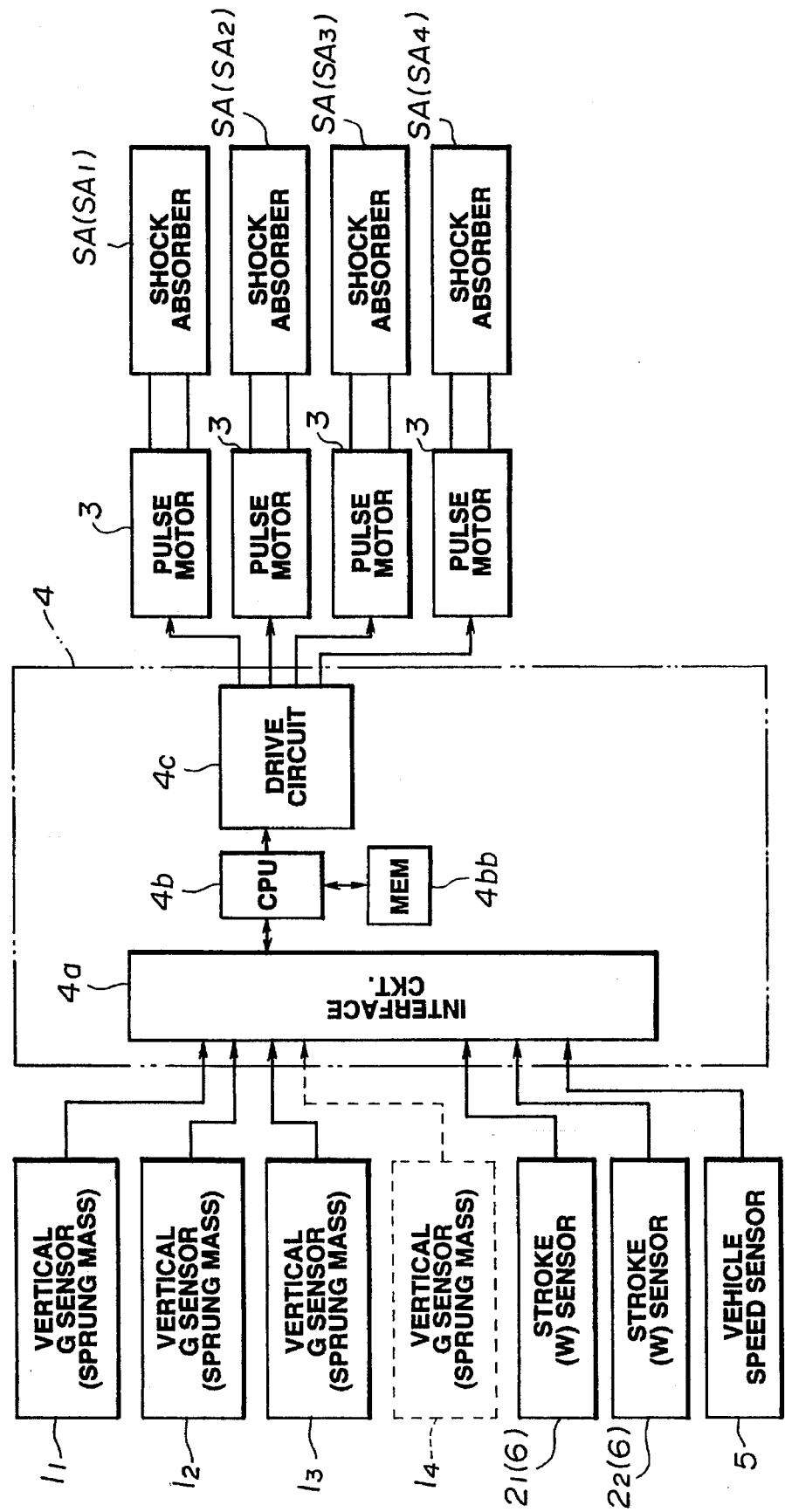
FIG. 2 is a circuit block diagram of the shock absorber damping force controlling apparatus in the preferred embodiment.

FIG. 2 shows a system circuit block diagram of the vehicular shock absorber damping force controlling apparatus in the embodiment.

The control unit 4 includes an interface circuit 4a, CPU (Central Processing unit) 4b, a drive circuit 4c, common bus, and a memory MEM 4bb.

The interface circuit 4a receives sensor signals from the respective sprung mass vertical acceleration sensors 1, stroke sensors 2, and vehicle speed sensor 5.

Figure 3A:
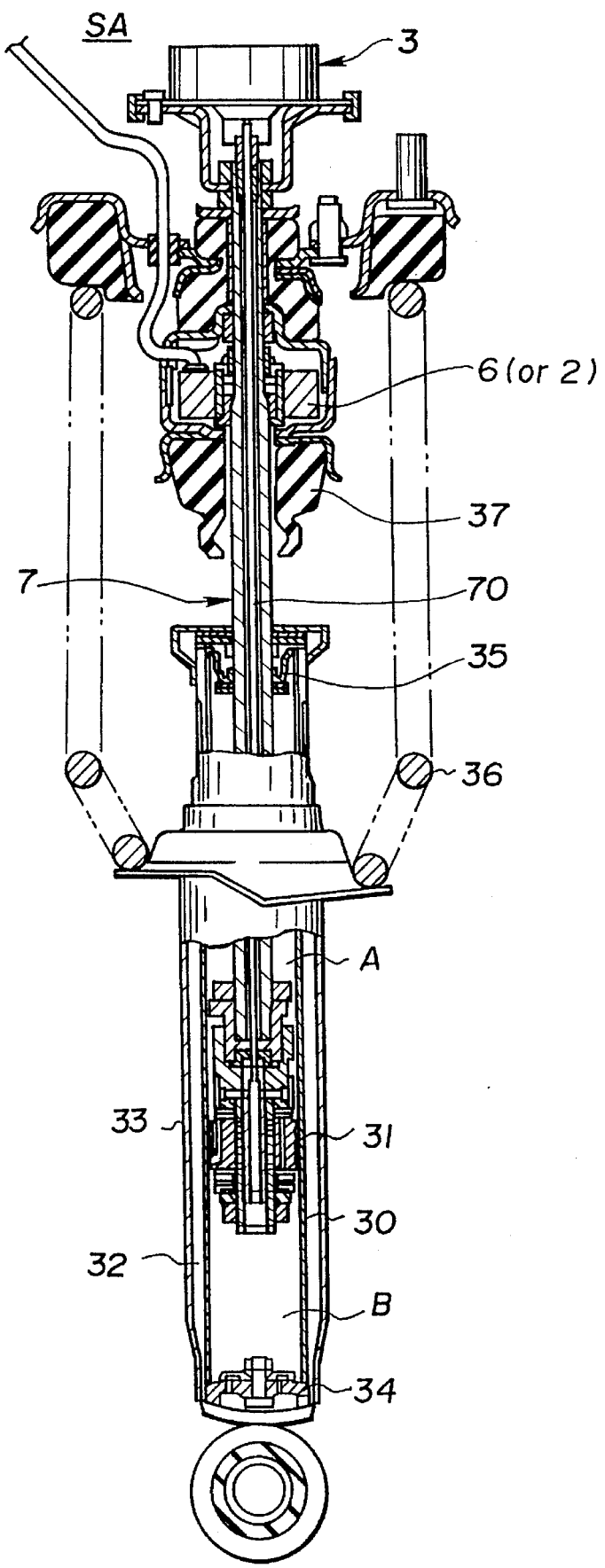
FIG. 3A is a partially sectional view of a representative shock absorber SA with a stroke (or weight) sensor mounted and wired used in the preferred embodiment shown in FIGS. 1 and 2.
Figure 3B:
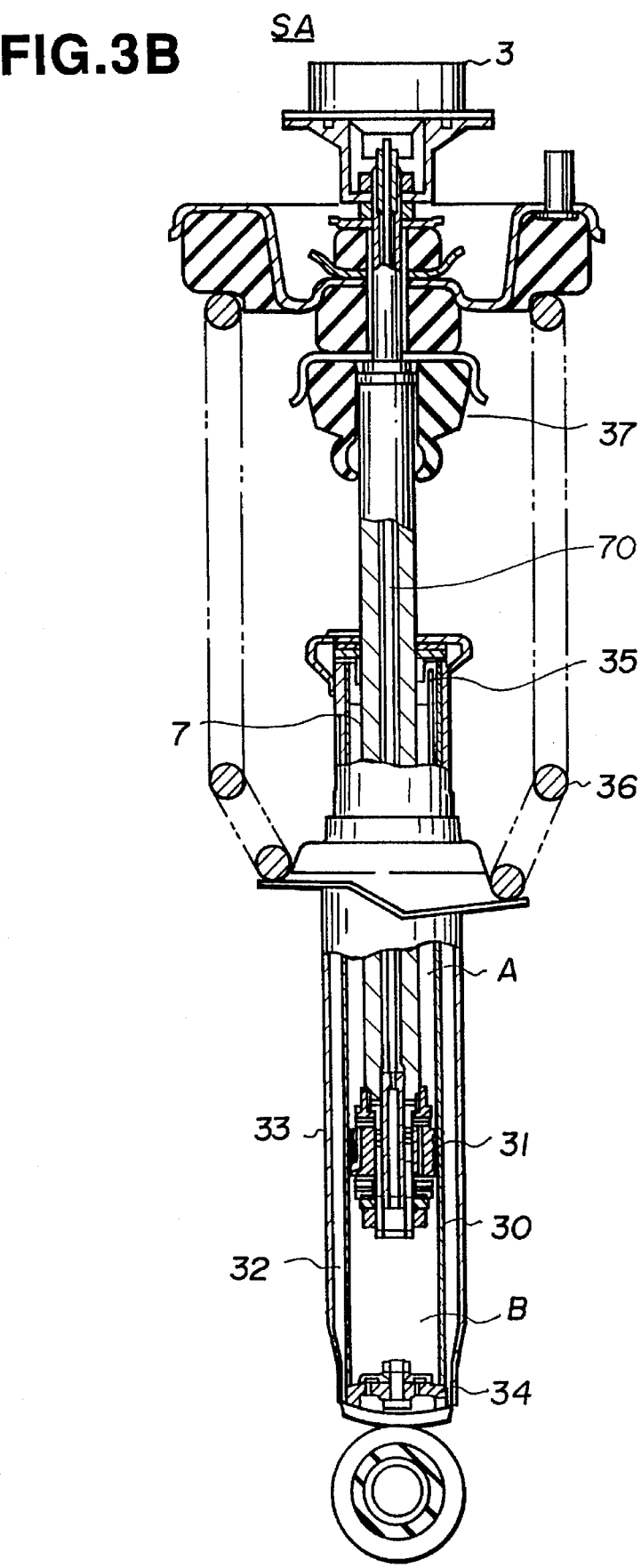
FIG. 3B is a partially sectional view of the representative shock absorber SA with no stroke (nor weight) sensor mounted and wired used in the embodiment shown in FIGS. 1 and 2.

Next, FIGS. 3A and 3B show cross sectional views of each representative shock absorber SA.

The shock absorber SA, as shown in FIG. 3A, includes: a cylinder 30, a piston 31 defining an upper portion chamber A and a lower portion chamber B; an outer envelope 33 in which a reservoir chamber 32 is formed on an outer peripheral end of the cylinder 30; a base 34 which defines the lower chamber B and the reservoir chamber 32; a guide member 35 which guides a sliding motion of a piston rod 7 with the other end of which a piston 31 is linked; a suspension spring 36 interposed between the outer envelope 33 and vehicle body; and a bumper rubber 37.

It is noted that, as shown in FIG. 3A, the weight sensor 6 (or alternatively stroke sensor 2) is disposed above the bumper rubber 37 and around the peripheral surface of the piston rod 7 but FIG. 3A shows the structure of each of the shock absorbers $SA_1$ and $SA_2$ located at the front left and right tire wheels. It is also noted that each of the shock absorbers $SA_3$ and $SA_4$ located at the rear tire wheels have omitted the structures and wirings of the stroke sensors (weight sensors) in the embodiment. Therefore, as shown in FIG. 3B, each shock absorber $SA_3$ and $SA_4$ has no stroke sensor 2 (weight sensor) from FIG. 3A.

Figure 4:
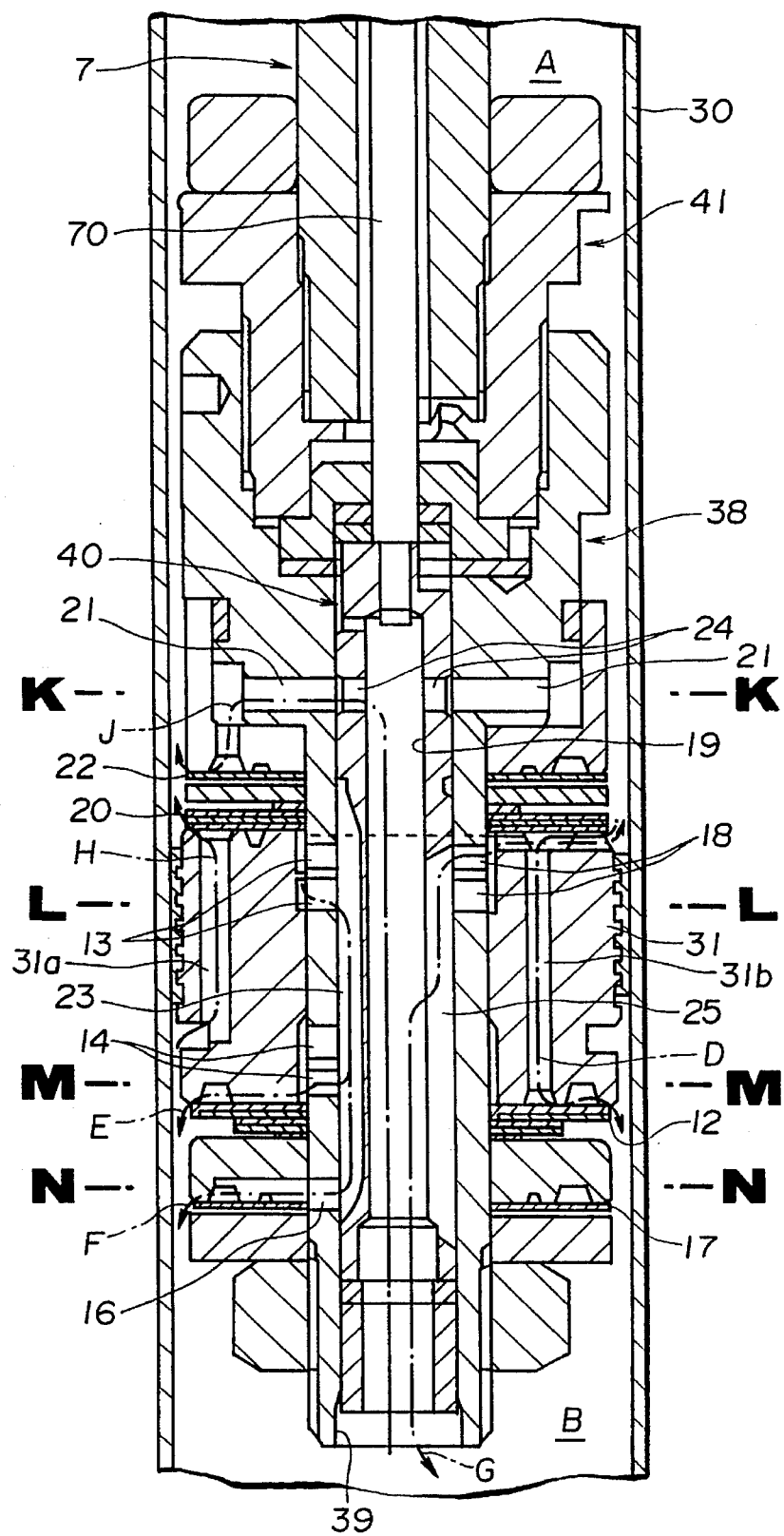
FIG. 4 is an enlarged, partially sectional view of the representative shock absorber shown in FIGS. 3A and 3B.

FIG. 4 shows an enlarged cross sectional view representing a part of the piston assembly 31 of the respective shock absorber SA.

As shown in FIG. 4, the piston 31 is formed with penetrating holes 31a and 31b. In addition, the piston 31 is provided with a compression stroke side attenuation valve 20 and an extension stroke side attenuating valve 12 respectively opening and closing the respective penetrating holes 31a and 31b. A stud 38 is spirally meshed with and fixed to a bound stopper 41 spirally meshed with and fixed to a tip end of the piston rod 7. The stud 38 is penetrated through the piston 31. In addition, the stud 38 is formed with a communication hole 39 which communicates the upper portion chamber A and the lower portion chamber B. Furthermore, an adjuster 40 which changes a flow passage cross-sectional area of the communication hole 39 is provided in the piston assembly.

Furthermore, an extension stroke side check valve 17 and a compression stroke side check valve 22 are also installed which enable and disable the fluid flow through the communication hole 39 in accordance with the direction of the flow of the fluid. It is noted that the adjuster 40 is rotated via a control rod 70 by means of the pulse motor 3 (referring back to FIGS. 3A and 3B).

It is noted that the stud 38 is formed with a first port 21, a second port 13, a third port 18, a fourth port 14, and fifth port 16, respectively in an upper order.

On the other hand, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages at the piston extension stroke: that is to say, 1) an extension stroke side first flow passage D such that the fluid passes the penetrating hole 31b, a valve opened internal side of the extension stroke side attenuation valve 12, and reaches the lower portion chamber B; 2) an extension stroke side second flow passage E in which the fluid flows through the second port 13, the longitudinal groove 23, the fourth port 14, a valve opened outer peripheral side of the extension stroke side attenuating valve 12, and reaches the lower portion chamber B; an extension stroke side third flow passage F in which the fluid passes through the second port 13, the longitudinal groove 23, and the fifth port 16; and a bypass flow passage G in which the fluid passes through the third port 18, the second lateral hole 25, and the hollow portion 19 and reaches the lower portion chamber B.

In addition, the fluid flow passage through which the fluid can be caused to flow during the compression stroke side of the piston 31 includes: 1) a compression stroke side first flow passage H in which the fluid flows through the penetrating hole 31a and valve opened compression stroke side attenuating valve 20; 2) a compression stroke side second flow passage J in which the hollow portion 19, the first lateral hole 24, the first port 21, and the opened compression stroke side check valve 22 and reaches the upper portion chamber A; and a bypass passage G in which the fluid flows through the hollow portion 19, the second lateral hole 25, and the third port 18.

Figure 5:
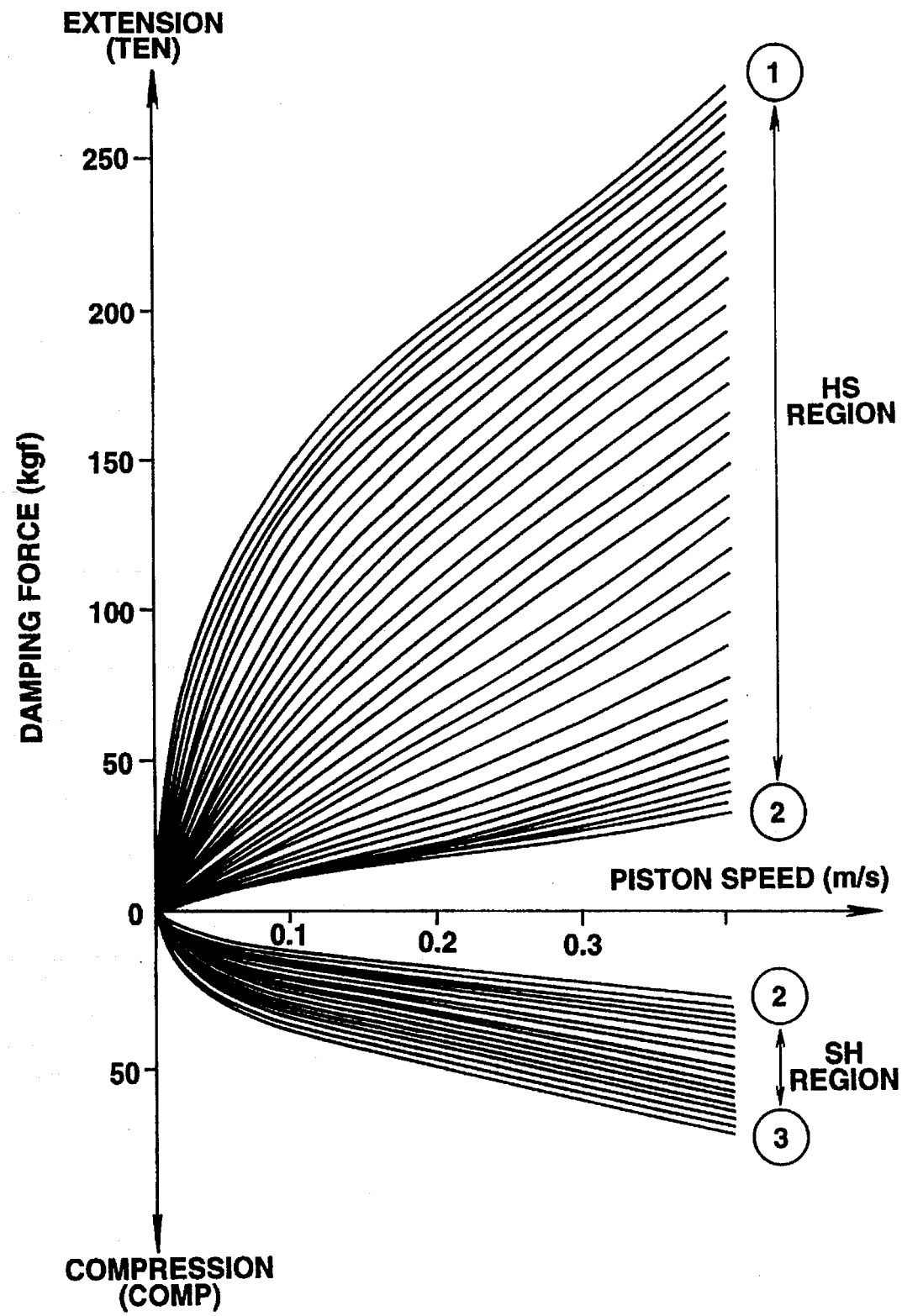
FIG. 5 is a characteristic graph representing damping forces with respect to a piston speed of the representative shock absorber shown in FIGS. 3A, 3B, and 4.
Figure 7A:
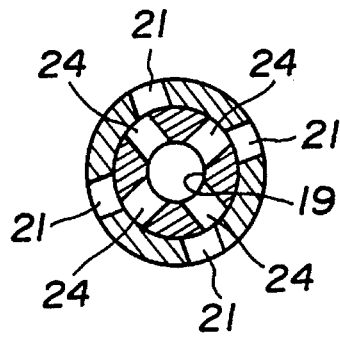
FIGS. 7A, 7B, and 7C are cross-sectional views cut away along a line K—K of FIG. 4 representing an essential part of the representative shock absorber shown in FIGS. 3A, 3B, and 4.
Figure 7B:
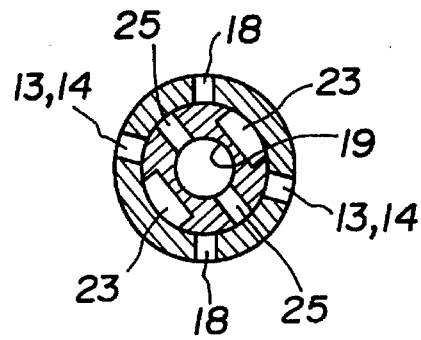
Figure 7C:
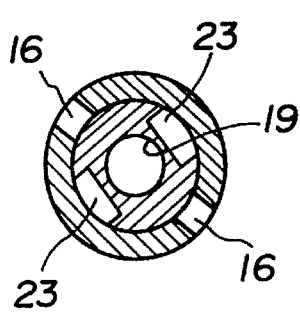
Figure 8A:
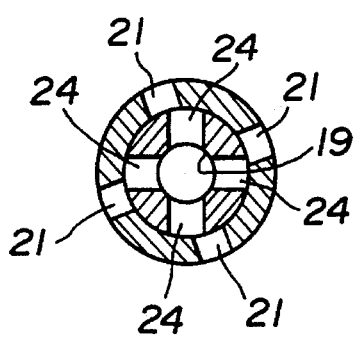
FIGS. 8A, 8B, and 8C are cross-sectional views cut away along lines L—L and M—M of FIG. 4 representing an essential part of the representative shock absorber shown in FIGS. 3A, 3B, and 4.
Figure 8B:
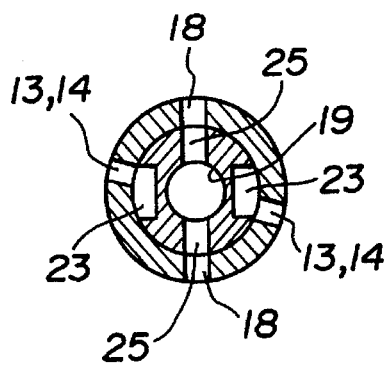
Figure 8C:
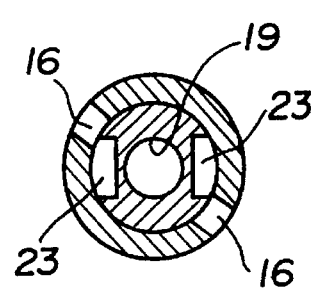
Figure 9A:
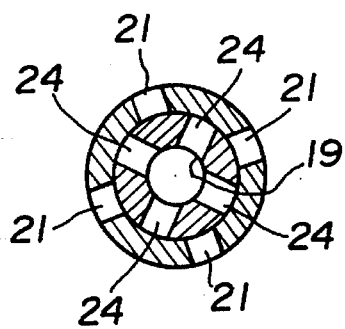
FIGS. 9A, 9B, and 9C are cross-sectional views cut away along a line N—N of FIG. 4 representing an essential part of the representative shock absorber shown in FIGS. 3A, 3B, and 4.
Figure 9B:
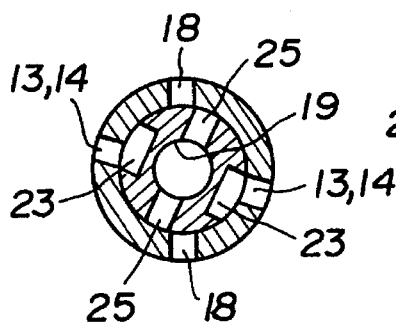
Figure 9C:
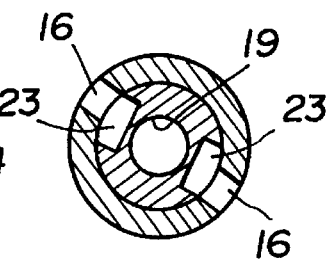

In summary, the shock absorber SA is so constructed as to enable to change the damping force coefficients at a multiple stage to achieve the damping characteristics as shown in FIG. 5 either in the extension stroke side or compression stroke side when the adjuster 40 is pivoted.

It is noted that, as shown in FIG. 5, the terminology of "damping coefficient" is used since the damping force characteristic with respect to the piston speed is changed with its gradients being varied.

In details, as shown in FIG. 6, when the adjuster 40 is pivoted in the counterclockwise direction from a position at which both of the extension and compression stroke sides are in the soft positions (hereinafter, referred to as a soft position SS) shown in FIG. 6, the damping coefficient at the extension stroke side can be changed at the multiple stages but the compression stroke side is fixed at the soft region (hereinafter, referred to as an extension stroke side hard region HS). On the contrary, when the adjuster 40 is pivoted in the clockwise direction therefrom, the damping coefficient at the compression stroke side is changeable to the hard region at the multiple stages and the extension stroke side is fixed to the soft region (hereinafter, referred to as a compression hard region SH).

Figure 10:
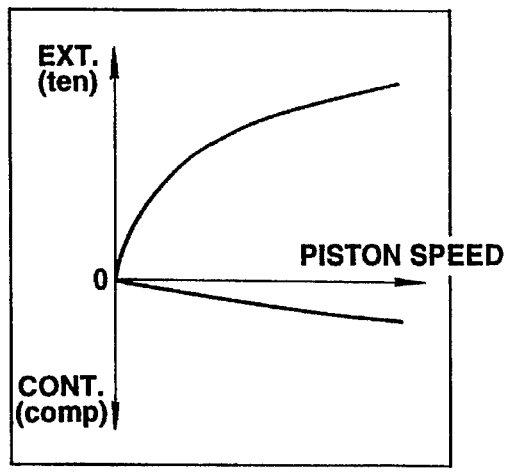
FIG. 10 is a damping force characteristic graph when an extension stroke side with respect to the piston of the representative shock absorber shown in FIGS. 3A, 3B, and 4 is in a hard damping force state.
Figure 11:
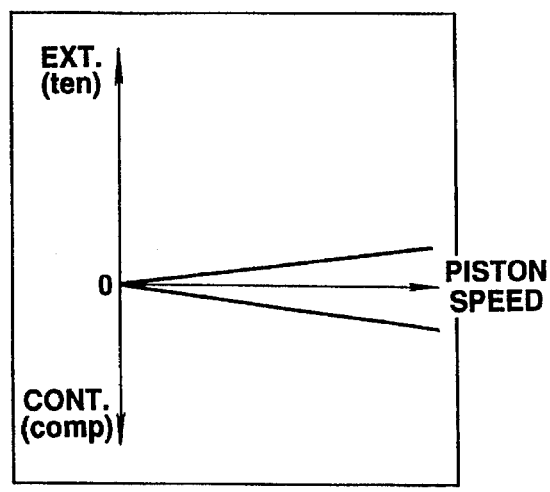
FIG. 11 is a damping force characteristic graph when both extension and compression stroke sides are in soft damping force states.
Figure 12:
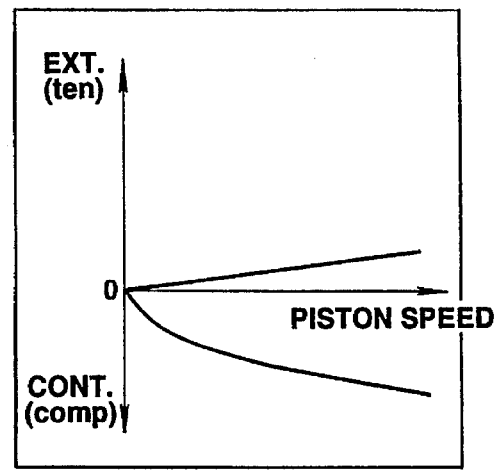
FIG. 12 is a damping force characteristic graph when the compression stroke side is in a hard damping force state.

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A, 7B, 7C, 8A, 8B, 8C, 9A, 9B, and 9C, respectively. The damping force characteristics at the respective positions ①, ②, and ③ are shown in FIGS. 10, 11, and 12.

Next, the detailed description of the control unit 4 will be described on the basis of the signal processing procedure.

Figure 13:
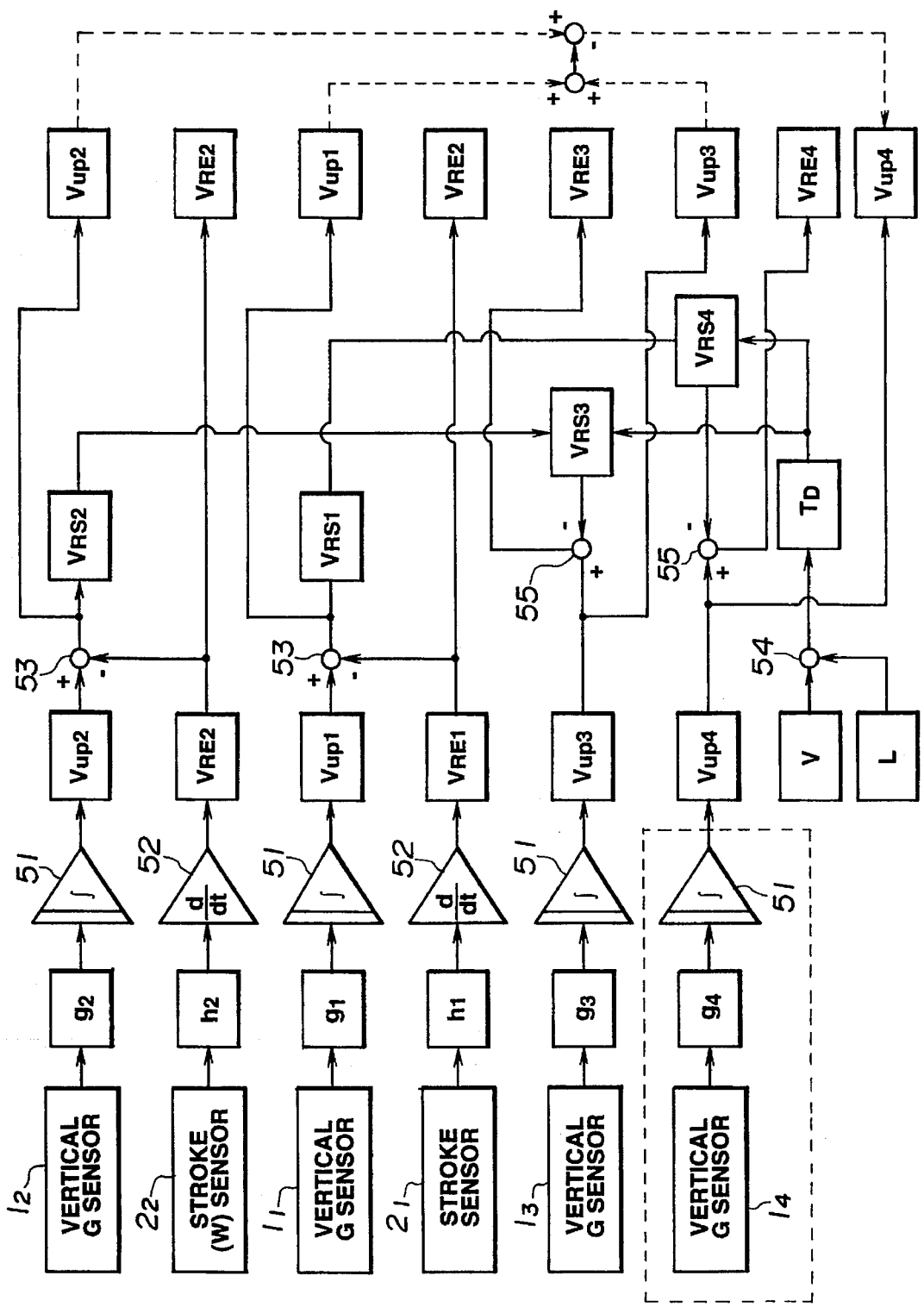
FIG. 13 is a signal processing circuit representing a signal processing process in the embodiment shown in FIG. 2.

FIG. 13 shows the signal processing procedure of the vehicular suspension damping force characteristic control apparatus in the preferred embodiment.

The acceleration signals $g_1$, $g_2$, $g_3$, and ($g_4$) (subscripts of 1 through 4 denotes the positions at which the respective sensors 1 in FIG. 1 are placed) are integrated with respect to time by means of integrators 51 and converted into the sprung mass vertical velocities $V_{up1}$, $V_{up2}$, $V_{up3}$, and ($V_{up4}$), respectively.

The displacement signals $h_1$ and $h_2$ input from the respective stroke sensors 2 are differentiated with respect to time by means of respective differentiaters 52 and converted into respective relative velocities $V_{RE1}$ and $V_{RE2}$ between the sprung mass thereat and the unsprung mass thereat.

Respective summing amplifiers (also called subtractors) 53 serve to subtract the relative velocities $V_{RE1}$ and $V_{RE2}$ from the sprung mass vertical velocities $V_{UP1}$ and $V_{UP2}$ located at the front right and front left tire wheels so as to be converted to road surface velocities $V_{RS1}$ and $V_{RS2}$ (i.e., the vertical velocity of the tire wheels following the road surface contours) at the front right and left tire wheels.

A calculator 54 serves to calculate a delay time $T_D$ in the same unit as the velocity at which the rear tire wheels arrive at the same road surface on which the front tire wheels have contacted from the instantaneous vehicle speed v and a previously input wheel base length L. Furthermore, this delay time $T_D$ is provided for the road surface velocities $V_{RS1}$ and $V_{RS2}$ at the front left and right wheels to be estimated as the road surface velocities $V_{RS3}$ and $V_{RS4}$ (i.e., the vertical velocity of the tire wheels following the road surface contours) at the rear left and right tire wheels.

Respective subtractors 55 serve to subtract the road surface velocities $V_{RS3}$ and $V_{RS4}$ from the sprung mass vertical velocities $V_{UP3}$ and $V_{UP4}$ at the rear left and right tire wheels so as to be converted into relative velocities $V_{RE3}$ and $V_{RE4}$ between the sprung mass and unsprung mass at the rear left and right tire wheels.

Consequently, the four wheel sprung mass velocities $V_{UP1}$, $V_{UP2}$, $V_{UP3}$, and ($V_{UP4}$) and the four wheel relative velocities $V_{RE1}$, $V_{RE2}$, $V_{RE3}$, and $V_{RE4}$ are obtained.

Figure 14:
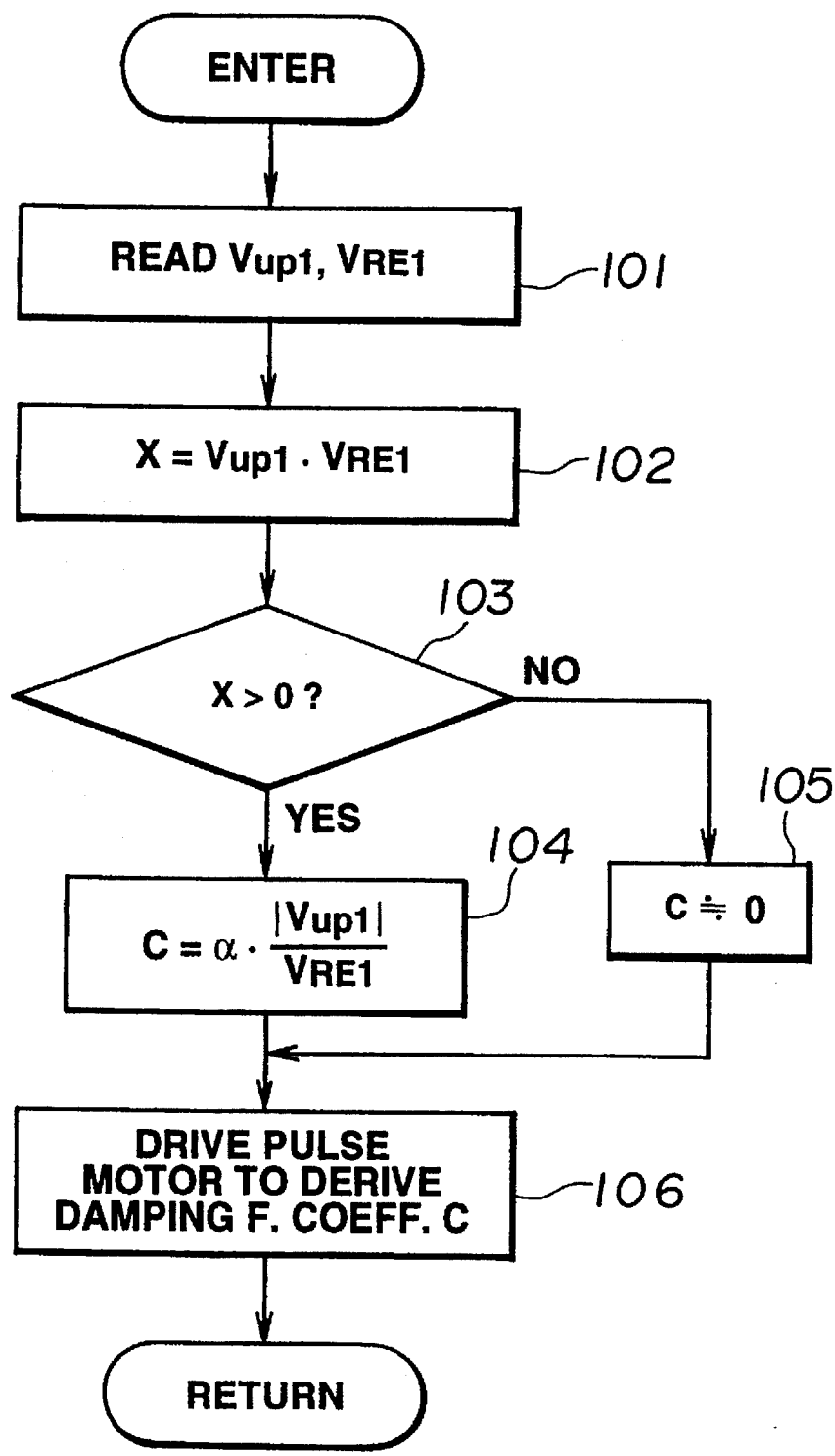
FIG. 14 is an operational flow chart executed by a control unit shown in FIG. 2.

Next, the control unit 4 shown in FIGS. 1 and 2 executes the damping force coefficient control procedure shown in the flowchart of FIG. 14 on the basis of the above-described four wheel sprung mass vertical velocities $V_{UP1}$, $V_{UP2}$, $V_{UP3}$, and ($V_{UP4}$) and relative velocities $V_{RE1}$, $V_{RE2}$, $V_{RE3}$, and $V_{RE4}$ for all of the four tire wheels but independently of one another.

As described below, the value of $V_{UP4}$ may be calculated using $V_{UP1}$, $V_{UP3}$, and $V_{UP2}$ as shown in dotted lines at the right side of FIG. 13.

The operational flowchart shown in FIG. 14 will be described below. It is noted that the damping force coefficient control is executed independently of each shock absorber SA. For example, the operational flowchart of the damping force coefficient characteristic control for the front left tire wheel shock absorber $SA_1$ will be explained.

At a step 101, the CPU 4b reads the corresponding sprung mass vertical velocity $V_{UP1}$ and relative velocity $V_{RE1}$.

At a step 102, the CPU 4b calculates a product X of those of the sprung mass vertical velocity $V_{UP1}$ and relative velocity $V_{RE1}$.

At a step 103, the CPU 4b determines whether the product X is larger than zero (0). If Yes, the routine goes to a step 104. If No, the routine goes to a step 105.

At a step 104, the CPu 4b calculates an optimum damping coefficient C according to a calculation formula shown in (1):

$$C = \alpha \cdot |V_{UP1}|/V_{RE1} \qquad (1),$$

wherein α denotes a constant.

At a step 105, C≈0.

At a step 106, the CPU 4b drives the pulse motor 3 to provide the damping force coefficient C for the shock absorber $SA_1$ derived at either of the steps 104 or 105.

It is noted that a sign of the damping force coefficient C derived at the equation (1) is incident with that of the relative velocity $V_{RE1}$. If the sign of the damping force coefficient C derived from the equation (1) is coincident with the sign of the relative velocity $V_{RE1}$ and if the relative velocity $V_{RE1}$ is positive, the adjuster 40 is controlled to place at the position at which the extension stroke side is in the hard region HS. If the relative velocity $V_{RE1}$ is negative, the adjuster 40 is controlled to place at the position at which the compression stroke side is in the hard region SH. If C≈0, the adjuster 40 is placed at the position (② in FIG. 6) forming the soft damping characteristics SS in both extension and compression stroke sides.

Operation of the Preferred Embodiment

Figure 15:
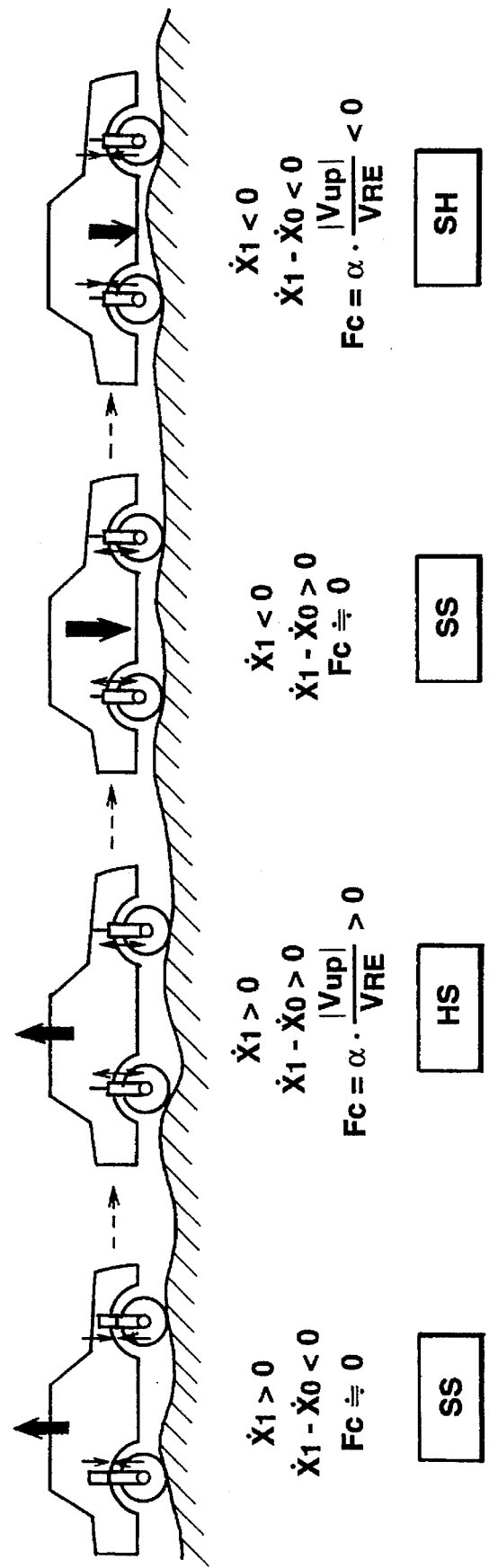
FIG. 15 is a schematic view of a series of vehicle runs on a recessed road surface for explaining an operation in the preferred embodiment shown in FIGS. 1 through 13.

FIG. 15 shows a series of motions in the front and rear shock absorbers $SA_1$, $SA_2$, $SA_3$, and $SA_4$ in the embodiment when the vehicle actually runs on a virtually recessed road surface.

When the direction (sign) of the sprung mass vertical velocity $V_{UP}$ is not coincident with the direction of the relative velocity $V_{RE}$, the shock absorbers SA are in the soft characteristics. On the other hand, when the direction of the sprung mass vertical velocity $V_{UP}$ is coincident with the direction of the relative velocity $V_{RE}$, the damping coefficient is increased in the direction of the relative velocity $V_{RE}$ so as to suppress vibration behaviors on the sprung mass.

Namely, the vibration suppression on the sprung mass is carried out on the basis of the theory of "sky hook".

In FIG. 15, $\dot{X}_1$ denotes each sprung mass vertical velocity, $\dot{X}_0$ denotes each relative velocity, Fc denotes the damping force of each one of the shock absorbers SA, SS denotes both extension and compression stroke side being in the soft damping force regions, HS denotes the extension stroke side falling the hard damping force region and the compression stroke side falling in the soft damping force region, and SH denotes the extension stroke side falling in the soft damping force region and the compression stroke side falling in the hard damping force region.

As described above, in the preferred embodiment, the damping force control on the basis of the sky hook theory is carried out to suppress the sprung mass on the basis of the sprung mass vertical velocity $V_{UP}$ and relative velocity $V_{RE}$ between the sprung mass and unsprung mass, the stroke sensors 2 to detect the relative displacement between the sprung mass and unsprung mass are installed for only two tire wheels, namely, at the positions in the vicinities to the front left and right tire wheels and are not installed in the vicinities to the rear left and right tire wheels.

Hence, the total number of the sensors 1 and 2 to detect the sprung mass vertical velocities and to detect the relative displacements between the sprung mass and unsprung mass are reduced and accordingly the number of wirings to the sensors 1 and 2 can be omitted by the reduced number of the sensors. Consequently, the assembly costs and mounting and electrical wirings of the sensors at the required positions can be reduced.

Especially, since the stroke sensors 2 are provided with assembly members to mount the stroke sensors on the unsprung mass portions, such assembly members as described above require high durabilities and superior antivibration (vibration resistance) characteristics, hence, require high costs themselves, and the wiring troubles occur due to their necessities to wire electrically between the sprung mass and unsprung mass, the assembly cost and wiring troubles can remarkably be reduced since such stroke sensors as described above can be reduced in the embodiment.

In addition, since, in the embodiment, the damping force position can be shifted toward a lower damping force coefficient side as the relative velocity $V_{RE}$ is higher using the equation (1) when the damping force coefficient C is calculated, the excessively high damping force is not generated and the vehicle driver's feeling of running the vehicle on the recessed and/or convex road surface cannot be given.

In more details, the damping force F generated at the shock absorber SA is established in the equations (2) and (3).

$$F = \alpha \cdot V_{UP} \quad (2)$$

$$F = C \cdot V_{RE} \quad (3),$$

wherein C denotes a constant number, the damping force coefficient, and, in other words, can be deemed to be the position of the adjuster 40 of the representative shock absorber SA.

Hence, $C = \alpha \cdot V_{UP}/V_{RE}$.

It is noted that although the required damping force F can be derived from the sprung mass vertical velocity $V_{UP}$ on the basis of the equation (2) and, from this derived damping force F, the optimum damping coefficient (position) can be determined, in this case, the relative velocity $V_{RE}$ (piston speed) is not considered. Consequently, depending upon the piston speed, the excessively high damping force might inevitably be brought out. In more details, as shown in FIG. 5, when both of two parameters of the damping force on the longitudinal axis and piston speed on the lateral axis are specified, the optimum position (damping force coefficient) can be selected. If the parameter of the piston speed is not specified, several selections of the positions of the adjuster 40 at which the same damping force can be generated can be made. Hence, if any one of the upper positions is selected from among many positions, the higher damping force than the actually required damping force may be generated when the piston speed becomes faster. In the case of the embodiment, such disadvantages as described above do not occur.

The present invention is not limited to the above-described embodiment.

For example, although in the embodiment, the vertical G (sprung mass vertical acceleration) sensors 1 are disposed at the positions of the vehicle body in the vicinities to the four wheel tire wheels and the sprung mass vertical velocities $V_{UP}$ are derived on the basis of the sensor signals, it is possible to reduce one of the vertical G sensors 1.

That is to say, since the vehicle body may be deemed to be the single rigid body, the remaining one sprung mass vertical velocity ($V_{UP4}$) from all of the four sprung mass vertical velocities ($V_{UP1}$, $V_{UP2}$, and $V_{UP3}$) can, for example, be calculated as $V_{UP4} = V_{UP1} + V_{UP3} - V_{UP2}$.

In this way, since one of the sprung mass vertical sensors 1 is omitted which detects the behavior of the vehicle body related to the sprung mass vertical velocity, the total number of the respective sprung mass vertical acceleration sensors 1 and relative velocity sensors 2 is further reduced. The cost reductions and operations of wiring of the sensors 1 and 2 can accordingly be achieved.

In addition, to perform the damping force coefficient control, the calculation formulae other than the equations of (1) through (3) to derive the optimum damping force coefficient may be used. For example, such an equation that the constant number is multiplied by the sprung mass vertical velocity or the other equation such that the constant number is multiplied by the relative velocity.

Although the stroke sensors 2 are used to detect such relative velocities as described in the embodiment, the weight sensors or other displacement sensors may be used.

Although, in the embodiment, such a shock absorber that while one stroke side is controlled to fall in the hard characteristic, the opposite stroke is fixed to fall in the soft characteristic is used, such a shock absorber SA that the damping coefficients at both of the extension stroke side and compression stroke side are simultaneously changed in the same direction may alternatively be used.

As described hereinabove, since the damping force characteristic (coefficient) for each shock absorber is controlled on the basis of the sprung mass vertical velocity and relative velocity according to the present invention related to the vehicle shock absorber suspension control apparatus and method, the relative velocity detecting means for detecting the behavior related to the relative velocity between the sprung mass and unsprung mass is installed only on the two tire wheels at the front left and right tire wheels and is not installed on the remaining two tire wheels at the rear left and right tire wheels, the total number of detecting means can be reduced and the number of wirings from the detecting means to the control means can be reduced. Consequently, the assembly cost of mounting the sensors on the vehicle and wiring operation can accordingly be reduced and partially omitted.

Especially, since the relative velocity detecting means has a high frequency input from the unsprung mass portion and requires the assembly members to be mounted on the unsprung mass portion, the durability and anti-vibration characteristic are needed. In addition, the wiring is required between the sprung mass and unsprung mass. Consequently, the assembly cost of mounting the relative velocity detecting means on the vehicle would be increased and wiring troubles would occur. However, according to the present invention, such detecting means as described above can be omitted. The effect of reducing the assembly cost and wiring trouble becomes accordingly higher.

In addition, the total number of the sprung mass vertical velocity sensors can accordingly be reduced.

Furthermore, the effect of reducing the assembly cost and wiring trouble can be enlarged.

Various types of embodiments and modifications can be made within the scope of the present invention which will be defined by the appended claims.

What is claimed is:

1. An apparatus for controlling damping force characteristics of vehicular shock absorbers independently of one another, comprising:

a) damping force characteristic changing means for changing damping force coefficients representing the respective damping force characteristics of the respective shock absorbers variably selectable in the respective shock absorbers in response to control signals respectively input thereto;

b) sprung mass vertical velocity determining means for determining vertical velocities of a sprung mass of a vehicle adjacent respective tire wheels of the vehicle;

c) front, tire wheel relative velocity determining means for determining the relative velocities between sprung mass portions and unsprung mass portions of the vehicle, said front tire wheel relative velocity determining means being disposed on vehicular portions adjacent only front left and right tire wheels;

d) vehicle speed detecting means for detecting a vehicle speed and outputting a vehicle speed indicative signal;

e) wheel base length storing means for storing a wheel base length of the vehicle;

f) front tire wheel velocity calculating means for calculating vertical velocities of the front left and right tire wheels on the basis of the relative velocities between the sprung mass portions and unsprung mass portions of the vehicle related to the front left and right tire wheels determined by said relative velocity determining means and on the basis of the sprung mass vertical velocities determined by said sprung mass vertical velocity determining means related to the front, left, and right tire wheels;

g) rear tire wheel velocity calculating means for calculating vertical velocities of the rear left and right tire wheels from the front left and right tire wheel vertical velocities, the vehicle wheel base length, and the vehicle speed indicative signal;

h) rear tire wheel relative velocity calculating means for calculating relative velocities between the sprung mass portions and unsprung mass portions of the vehicle related to rear left and right tire wheels on the basis of the rear left and right tire wheel vertical velocities calculated by said rear tire wheel velocity calculating means and of the sprung mass vertical velocities determined by said sprung mass vertical velocity determining means related to the rear left and right tire wheels; and i) damping force characteristic controlling means for providing respective control signals for said damping force characteristic changing means in accordance with the determined and calculated respective relative velocities between the sprung mass portions and unsprung mass portions related to the respective tire wheels and with the determined respective sprung mass vertical velocities related to the respective tire wheels so that the respective shock absorbers provide optimum damping force characteristics.

2. An apparatus for controlling damping force characteristics of vehicular shock absorbers independently of one another as claimed in claim 1, wherein said sprung mass vertical velocity determining means comprises three vertical acceleration sensors which are so constructed as to detect respective sprung mass vertical accelerations adjacent three tire wheels of the four tire wheels of the vehicle and integrating means for integrating signals related to the sprung mass vertical accelerations on the three tire wheels with respect to time so as to determine the sprung mass vertical velocities on the three tire wheels and wherein said sprung mass vertical velocity determining means further comprises sprung mass vertical velocity calculating means for calculating the sprung mass vertical velocity adjacent the remaining tire wheel on the basis of the signals related to the determined sprung mass vertical velocity determining means related to the former three tire wheels.

3. An apparatus for controlling damping force characteristics of vehicular shock absorbers independently of each other as claimed in claim 2, wherein said front tire wheel relative velocity determining means comprises stroke sensors located between the sprung mass portions and unsprung mass portions adjacent the front left and right tire wheels, respectively, which are so constructed as to detect relative displacements between the sprung mass portions and unsprung mass portions related to the front left and right tire wheels and differentiating means for differentiating signals indicative of the relative displacements between the sprung mass portions and unsprung mass portions related to the front left and right tire wheels with respect to time so as to determine the front tire wheel relative velocities related to the front left and right tire wheels.

4. An apparatus for controlling damping force characteristics of vehicular shock absorbers independently of one another, comprising:

a) damping force characteristic changing means for changing damping force coefficients representing the respective damping force characteristics of the respective shock absorbers variably selectable in the respective shock absorbers in response to control signals respectively input thereto;

b) sprung mass vertical velocity determining means for determining vertical velocities of a sprung mass of a vehicle adjacent respective tire wheels of the vehicle;

c) front, tire wheel relative velocity determining means for determining the relative velocities between sprung mass portions and unsprung mass portions of the vehicle, said front tire wheel relative velocity determining means being disposed on vehicular portions adjacent only front left and right tire wheels;

d) vehicle speed detecting means for detecting a vehicle speed and outputting a vehicle speed indicative signal;

e) wheel base length storing means for storing a wheel base length of the vehicle;

f) front tire wheel velocity calculating means for calculating vertical velocities of the front left and right tire wheels on the basis of the relative velocities between the sprung mass portions and unsprung mass portions of the vehicle related to the front left and right tire wheels determined by said relative velocity determining means and on the basis of the sprung mass vertical velocities determined by said sprung mass vertical velocity determining means relative to the front, left, and right tire wheels;

g) rear tire wheel velocity calculating means for calculating vertical velocities of the rear left and right tire wheels from the front left and right tire wheel vertical velocities, the vehicle wheel base length, and the vehicle speed indicative signal;

h) rear tire wheel relative velocity calculating means for calculating relative velocities between the sprung mass portions and unsprung mass portions of the vehicle related to rear left and right tire wheels on the basis of the rear left and right tire wheel vertical velocities calculated by said rear tire wheel velocity calculating means and of the sprung mass vertical velocities determined by said sprung mass vertical velocity determining means related to the rear left and right tire wheels; and i) damping force characteristic controlling means for providing respective control signals for said damping force characteristic changing means in accordance with the determined and calculated respective relative velocities between the sprung mass portions and unsprung mass portions related to the respective tire wheels and with the determined respective sprung mass vertical velocities related to the respective tire wheels so that the respective shock absorbers provide optimum damping force characteristics;

wherein said sprung mass vertical velocity determining means comprises three vertical acceleration sensors which are so constructed as to detect respective sprung mass vertical accelerations adjacent three tire wheels of the four tire wheels of the vehicle and integrating means for integrating signals related to the sprung mass vertical accelerations on the three tire wheels with respect to time so as to determine the sprung mass vertical velocities on the three tire wheels and wherein said sprung mass vertical velocity determining means further comprises sprung mass vertical velocity calculating means for calculating the sprung mass vertical velocity adjacent the remaining tire wheel on the basis of the signals related to the determined sprung mass vertical velocity determining means related to the former three tire wheels;

wherein said front tire wheel relative velocity determining means comprises stroke sensors located between the sprung mass portions and unsprung mass portions adjacent the front left and right tire wheels, respectively, which are so constructed as to detect relative displacements between the sprung mass portions and unsprung mass portions related to the front left and right tire wheels and differentiating means for differentiating signals indicative of the relative displacements between the sprung mass portions and unsprung mass portions related to the front left and right tire wheels with respect to time so as to determine the front tire wheel relative velocities related to the front left and right tire wheels; and wherein said damping force characteristic controlling means comprises:

first calculating means for calculating a product X of the related sprung mass vertical velocity $V_{UP}$ and of the related relative velocity $V_{RE}$ for each shock absorber SA;

second determining means for determining whether the calculated product of X is larger than 0;

second calculating means for calculating the optimum damping force coefficient C for the corresponding shock absorber SA using the formula, $C=\alpha \cdot |V_{UP}|/V_{RE}$, wherein $\alpha$ denotes a constant, when said second determining means determines that the product X is larger than 0, and the formula, C=0, when said second determining means determines that the product X is not larger than 0; and first driving signal generating means for generating control signals for each one of pulse motors associated with said damping force characteristic changing means of each one of the respective shock absorbers on the basis of the calculated optimum damping coefficient C, each one of the damping force characteristic changing means being placed at one of variable positions according to which each one of the shock absorbers falls in an extension stroke hard characteristic region HS when a sign of the calculated optimum damping force coefficient C is coincident with a sign of the related relative velocity $V_{RE}$ and the related relative velocity $V_{RE}$ is positive (+), being placed at another position of the variable positions according to which each one of the shock absorbers falls in a compression stroke hard characteristic region SH when the sign of the calculated optimum damping force coefficient C is coincident with a sign of the related relative velocity $V_{RE}$ and the related relative velocity $V_{RE}$ is negative (−), and being placed at another position of the variable positions according to which each one of the shock absorbers falls in both extension and compression stroke sides soft characteristic regions SS when C≈0.

5. An apparatus for controlling damping force characteristics of vehicular shock absorbers independently of each other, comprising:

a) damping force characteristic changing means for changing damping force coefficients representing the respective damping force characteristics of the respective shock absorbers variably selectable in the respective shock absorbers in response to control signals respectively input thereto;

b) sprung mass vertical velocity determining means for determining vertical velocities of a sprung mass of a vehicle adjacent respective tire wheels of the vehicle;

c) front, tire wheel relative velocity determining means for determining the relative velocities between sprung mass portions and unsprung mass portions of the vehicle, said front tire wheel relative velocity determining means being disposed on vehicular portions adjacent only front left and right tire wheels;

d) vehicle speed detecting means for detecting a vehicle speed and outputting a vehicle speed indicative signal;

e) wheel base length storing means for storing a wheel base length of the vehicle;

f) front tire wheel velocity calculating means for calculating vertical velocities of the front left and right tire wheels on the basis of the relative velocities between the sprung mass portions and unsprung mass portions of the vehicle related to the front left and right tire wheels determined by said relative velocity determining means and on the basis of the sprung mass vertical velocities determined by said sprung mass vertical velocity determining means relative to the front, left, and right tire wheels;

g) rear tire wheel velocity calculating means for calculating vertical velocities of the rear left and right tire wheels from the front left and right tire wheel vertical velocities, the vehicle wheel base length, and the vehicle speed indicative signal;

h) rear tire wheel relative velocity calculating means for calculating relative velocities between the sprung mass portions and unsprung mass portions of the vehicle related to rear left and right tire wheels on the basis of the rear left and right tire wheel vertical velocities calculated by said rear tire wheel velocity calculating means and of the sprung mass vertical velocities determined by said sprung mass vertical velocity determining means related to the rear left and right tire wheels; and i) damping force characteristic controlling means for providing respective control signals for said damping force characteristic changing means in accordance with the determined and calculated respective relative velocities between the sprung mass portions and unsprung mass portions related to the respective tire wheels and with the determined respective sprung mass vertical velocities related to the respective tire wheels so that the respective shock absorbers provide optimum damping force characteristics;

wherein said sprung mass vertical velocity determining means comprises three vertical acceleration sensors which are so constructed as to detect respective sprung mass vertical accelerations adjacent three tire wheels of the four tire wheels of the vehicle and integrating means for integrating signals related to the sprung mass vertical accelerations on the three tire wheels with respect to time so as to determine the sprung mass vertical velocities on the three tire wheels and wherein said sprung mass vertical velocity determining means further comprises sprung mass vertical velocity calculating means for calculating the sprung mass vertical velocity adjacent the remaining tire wheel on the basis of the signals related to the determined sprung mass vertical velocity determining means related to the former three tire wheels;

wherein the remaining sprung mass vertical velocity $V_{UP4}$ is derived as follows: $V_{UP4}=V_{UP1}+V_{UP3}-V_{UP2}$, wherein $V_{UP1}$ denotes the sprung mass vertical velocity adjacent to the front left tire wheel, $V_{UP3}$ denotes the sprung mass vertical velocity adjacent to the rear left tire wheel, and $V_{UP2}$ denotes the sprung mass vertical velocity adjacent to the front right tire wheel, and $V_{UP4}$ denotes the sprung mass vertical velocity adjacent to the rear right tire wheel.

6. A method for controlling damping force characteristics of vehicular shock absorbers independently of one another, said shock absorbers having respective damping force characteristic changing means for changing the damping force coefficients representing the damping force characteristics, said changing means being variably selectable in response to control signals respectively input thereto, comprising the steps of:

a) determining the sprung mass vertical velocities adjacent respective tire wheels of the vehicle;

b) providing front tire wheel relative velocity determining means for determining relative velocities between sprung mass portions and unsprung mass portions of the vehicle, said front tire wheel relative velocity determining means being disposed on vehicular portions placed adjacent to only front left and right tire wheels;

c) detecting a vehicle speed and outputting a vehicle speed indicative signal;

d) reading a wheel base length of the vehicle;

e) calculating vertical velocities of the front left and right tire wheels on the basis of the relative velocities between the sprung mass portions and unsprung mass portions of the vehicle related to the front left and right tire wheels determined by said relative velocity determining means and on the basis of the sprung mass vertical velocities determined by said sprung mass vertical velocity determining means related to the front left and right tire wheels;

f) calculating the vertical velocities of the rear left and right tire wheels from the vertical velocities of the front left and right tire wheels, the vehicle wheel base length, and the vehicle speed indicative signal;

g) calculating relative velocity between the sprung mass portions and unsprung mass portions of the vehicle related to rear left and right tire wheels on the basis of the rear left and right tire wheel vertical velocities calculated in step f) and the sprung mass vertical velocities determined in step a) and related to the rear left and right tire wheels; and h) providing the respective control signals for said damping force characteristic changing means in accordance with the determined and calculated respective relative velocities between the sprung mass portions and unsprung mass portions related to the respective tire wheels and with the determined respective sprung mass vertical velocities related to the respective tire wheels so that the respective shock absorbers provide optimum damping force characteristics.

7. An apparatus for controlling a damping force characteristic of a vehicular shock absorber, comprising:

a) damping force characteristic changing means for operatively changing the damping force characteristic of the shock absorber to a desired damping force characteristic in response to a control signal input thereto;

b) sprung mass vertical acceleration sensors which are located on a portion of a vehicle body adjacent to front left and right tire wheels and rear left and right tire wheels and so constructed as to generate sprung mass acceleration signals related to the vehicle body adjacent to the front left and right tire wheels and to the rear left and right tire wheels;

c) sprung mass vertical velocity determining means for determining the sprung mass vertical velocity related to the vehicle body adjacent to the front left and right tire wheels and to the rear left and right tire wheels based on said sprung mass acceleration signals;

d) front tire wheel relative displacement sensors which are so constructed as to detect relative displacements between the front tire wheels and the sprung mass of the vehicle body located adjacent to the front tire wheels and output front tire wheel relative displacement signals indicative thereof;

e) front tire wheel relative velocity determining means for determining the relative velocities between the vehicle body located adjacent to the front left and right tire wheels and the unsprung mass of the front tire wheels on the basis of the front tire wheel relative displacement signals;

f) vehicle speed detecting means for detecting the vehicle speed of the vehicle and for outputting a vehicle speed signal indicative thereof;

g) wheel base length storing means for storing a wheel base length of the vehicle;

h) front tire wheel velocity calculating means for calculating vertical velocities of the front left and right tire wheels on the basis of the relative velocities related to the front left and right tire wheels derived from the front tire wheel relative velocities determining means and the sprung mass vertical velocities determined by said sprung mass vertical velocities determining means related to the front left and right tire wheels;

i) rear tire wheel velocity calculating means for calculating rear left and right tire wheel vertical velocities based on the vehicle wheel base length and the vehicle speed signal;

j) rear tire wheel relative velocity calculating means for calculating relative velocities between the sprung mass located adjacent to the rear left and right tire wheels and unsprung mass of the rear left and right tire wheels on the basis of the rear left and right tire wheel vertical velocities calculated by said rear tire wheel velocity calculating means and of the sprung mass vertical velocity determined by the sprung mass vertical velocities determining means related to the rear left and right tire wheels; and k) damping force characteristic controlling means for providing the control signal for said damping force characteristic changing means in accordance with the determined and calculated relative velocity between the sprung and unsprung mass related to the corresponding tire wheel and with the determined sprung mass vertical velocity related to the corresponding tire wheel so that the shock absorber provides the desired damping force characteristic.

8. The apparatus for controlling damping force characteristics of vehicular shock absorbers independently of one another as claimed in claim 1, wherein a direction of said sprung mass vertical velocity is deemed positive in an upward direction and negative in a downward direction, and a direction of said relative vertical velocity between the sprung mass and the unsprung mass is deemed positive when a displacement between the sprung mass and the unsprung mass is increasing and negative when the displacement is decreasing, and said damping force characteristic controlling means includes means for providing control signals to respective shock absorbers to provide a hard damping characteristic in the direction of the relative vertical velocity when the sprung mass vertical velocity and the relative vertical velocity are in the same direction and to provide a soft damping characteristic when the directions of the sprung mass vertical velocity and the relative vertical velocity are in different directions.

9. The apparatus for controlling damping force characteristics of vehicular shock absorbers independently of one another as claimed in claim 7, wherein a direction of said sprung mass vertical velocity is deemed positive in an upward direction and negative in a downward direction, and a direction of said relative vertical velocity between the sprung mass and the unsprung mass is deemed positive when a displacement between the sprung mass and the unsprung mass is increasing and negative when the displacement is decreasing, and said damping force characteristic controlling means includes means for providing control signals to respective shock absorbers to provide a hard damping characteristic in the direction of the relative vertical velocity when the sprung mass vertical velocity and the relative vertical velocity are in the same direction and to provide a soft damping characteristic when the directions of the sprung mass vertical velocity and the relative vertical velocity are in different directions.

* * * * *

UNITED STATES PATENT AND TRADEMARK OFFICE
CERTIFICATE OF CORRECTION

PATENT NO. : 5,488,556
DATED : January 30, 1996
INVENTOR(S) : Mitsuo Sasaki

It is certified that error appears in the above-indentified patent and that said Letters Patent is hereby corrected as shown below:

Title page, item [21] Application number should read --216,040--.

Signed and Sealed this

Eleventh Day of February, 1997

Attest:

BRUCE LEHMAN

*Attesting Officer*      *Commissioner of Patents and Trademarks*